United States Patent
Di Meco et al.

(10) Patent No.: US 8,012,056 B2
(45) Date of Patent: Sep. 6, 2011

(54) ELASTICALLY EXTENSIBLE POLY-V TRANSMISSION BELT FOR DRIVING ACCESSORIES OF AN INTERNAL COMBUSTION ENGINE

(75) Inventors: Marco Di Meco, Pescara (IT); Carlo Trappolini, Montesilvano (IT); Marino Petaccia, Lettomanoppello (IT)

(73) Assignee: Dayco Europe S.R.L. Con Unico Socio, Chieti (IT)

( * ) Notice: Subject to any disclaimer, the term of this patent is extended or adjusted under 35 U.S.C. 154(b) by 815 days.

(21) Appl. No.: 11/576,675

(22) PCT Filed: Oct. 4, 2004

(86) PCT No.: PCT/IT2004/000543
§ 371 (c)(1),
(2), (4) Date: Feb. 15, 2008

(87) PCT Pub. No.: WO2006/038229
PCT Pub. Date: Apr. 13, 2006

(65) Prior Publication Data
US 2008/0196818 A1    Aug. 21, 2008

(51) Int. Cl.
*F16G 5/00* (2006.01)
(52) U.S. Cl. ............ 474/263; 474/268; 57/902
(58) Field of Classification Search ............ 474/204, 474/205, 237, 263, 266, 267, 268; 57/902, 57/236, 237
See application file for complete search history.

(56) References Cited

U.S. PATENT DOCUMENTS

| | | | | |
|---|---|---|---|---|
| 4,083,260 A | * | 4/1978 | Carlson et al. | 474/263 |
| 4,790,802 A | * | 12/1988 | Onoe et al. | 57/902 |
| 5,425,681 A | * | 6/1995 | Van Hook | 474/263 |
| 5,505,667 A | * | 4/1996 | Van Hook | 474/263 |
| 5,802,839 A | * | 9/1998 | Van Hook | 57/236 |
| 6,132,328 A | * | 10/2000 | Kinoshita et al. | 474/268 |
| 7,254,934 B2 | * | 8/2007 | Wu | 57/241 |
| 2003/0027920 A1 | | 2/2003 | Kinoshita et al. | |

FOREIGN PATENT DOCUMENTS
EP   0799917   10/1997

OTHER PUBLICATIONS
International Search Report and Written Opinion of the International Searching Authority dated Jun. 3, 2005 for International Application No. PCT/IT2004/000543; Applicant, Dayco Europe S.r.l.

* cited by examiner

*Primary Examiner* — William A Rivera
(74) *Attorney, Agent, or Firm* — Sheridan Ross, P.C.

(57) ABSTRACT

Poly-V belt, particularly for driving accessories of an internal combustion engine, comprising a cord realized from a yarn composed of a plurality of filaments by means of a first twisting in which are formed at least two plied yarns each composed of at least one yarn and a second twisting in which the plied yarns are twisted together to form the cord; the first twisting and the second twisting are made in opposite directions, and the numbers of twists per meter of the two twisting steps are calculated so that in the finished cord the filaments form with the axis of the cord an angle smaller than 3.3°.

7 Claims, 2 Drawing Sheets

ELASTICALLY EXTENSIBLE POLY-V TRANSMISSION BELT FOR DRIVING ACCESSORIES OF AN INTERNAL COMBUSTION ENGINE

TECHNICAL FIELD

The present invention concerns a transmission belt, particularly for driving accessories of an internal combustion engine, of the type with multiple races or poly-V type.

BACKGROUND ART

In order to facilitate fitting on the engine, so-called "elastic" poly-V belts have recently been introduced on the automobile market.

"Elastic" or "elastically extensible" belts, that is having resistant inserts or cords with a relatively low tensile modulus of elasticity and able to allow an elastic elongation of the belt during assembly, have been known for decades in the field of industrial applications, for example in electric household appliances, in which the loads transmitted and the requirements of duration are not as severe as in the automobile field; these belts are usually fitted manually since their tensile modulus of elasticity is very low and they can be stretched elastically with acceptable stresses.

For automobile applications, in which there is the similar problem of fitting the belt onto the transmission pulleys without varying the centre distance between the pulleys but rather by extending the belt, elastic belts have only recently been introduced on the market. In fact, only materials of the latest generation allow acceptable compromises to be found between the need to "elongate" the belt elastically and the strict functional requirements of automobile applications.

A problem connected with the known elastic belts is how to maintain over time a functionally acceptable level of tension for the transmission. The tension decay over time is normally related to the tensile modulus of elasticity of the belt, in the sense that, when the modulus is reduced there is a corresponding increase in the tension decay.

In practice, this means that when the modulus of an elastic belt is reduced beyond certain limits, the belt tends to lose tension rapidly while working and therefore works slack over time until its ability to transmit the load is compromised.

It is known how a reduction of the modulus of a belt may be obtained by increasing the number of twists of the cords, while the materials and all other constructive characteristics remain the same.

In particular, cords are known that are made of yarn that has undergone a first twisting process to obtain plied yarns, which are then subjected to a second twisting process in the opposite direction. It is known that increasing the number of twists per unit length of the yarns and of the plied yarns determines a reduction in the tensile modulus of elasticity of the cord.

However, cords with a high number of twists per unit length present a greater tendency to elastic decay.

On the basis of the above, the need to reduce the tensile modulus of elasticity of a belt clashes with the antithetic need of ensuring that tension losses are acceptable for the application.

DISCLOSURE OF INVENTION

The aim of the present invention is to provide a transmission belt of the type with multiple races or poly-V type, particularly for driving accessories of an internal combustion engine, which allows the above problem to be solved, and that is which presents a low modulus, so that it can be easily fitted, and at the same time an acceptable tension decay over time.

The above aim is achieved by a belt according to claim 1.

BRIEF DESCRIPTION OF THE DRAWINGS

For a better understanding of the present invention, a preferred embodiment will now be described purely as an example without limitation, with reference to the enclosed drawings, in which.

BEST MODE FOR CARRYING OUT THE INVENTION

Figure 1:
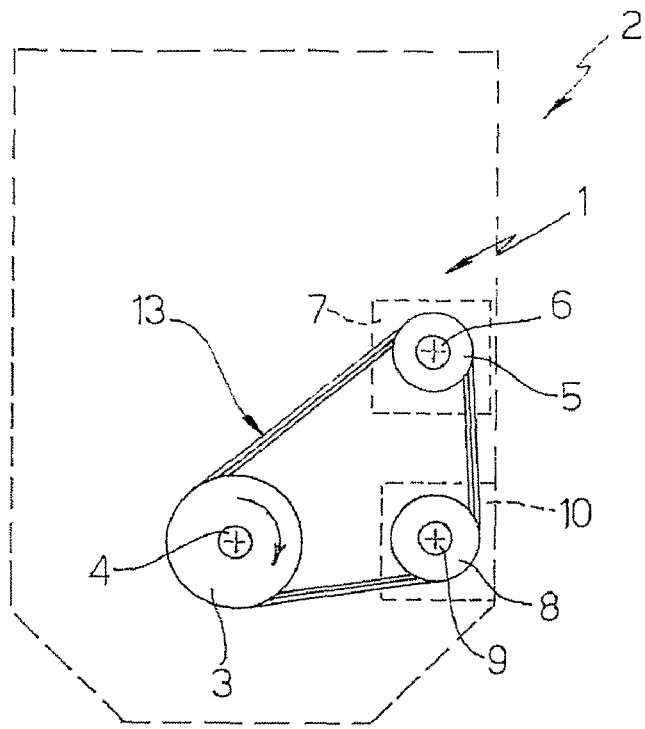
FIG. 1 is a front schematic view of a belt transmission for driving accessories of an internal combustion engine of a motor vehicle, using a belt according to the present invention.

With reference to FIG. 1, the number 1 indicates as a whole a belt transmission for driving a plurality of accessories of an internal combustion engine 2.

The transmission comprises a first drive pulley 3 keyed onto a crankshaft 4 of the engine 2, a second pulley 5 keyed onto a shaft 6 that drives a first accessory 7, for example an alternator, and a third pulley 8 keyed onto a shaft 9 that drives a second accessory 10, for example a compressor of an air conditioning system.

The transmission 1 also comprises a belt 13 of the type with multiple races or poly-V type, which is wound onto the pulleys 3, 5 and 8, also of the type with multiple races.

Figure 2:
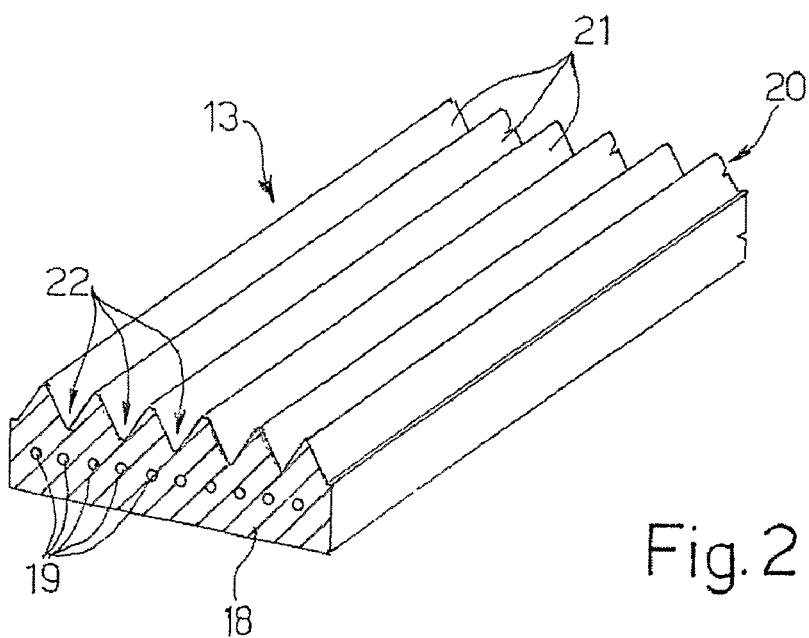
FIG. 2 is a perspective view of a portion of the belt in FIG. 1.

With reference to FIG. 2, the belt 13 comprises a body 18 of elastomer material, a plurality of resistant filiform elements 19 parallel and adjacent to one another and longitudinally embedded into the body 18, and a coupling portion 20 defined by a plurality of V shaped ribs 21 parallel and adjacent to one another, extending integrally from the body 18 and in a longitudinal direction with respect to the body itself, so as to form V shaped races 22, each enclosed between two adjacent ribs 21.

The body 18 and the coupling portion 20 may be made of any elastomer material suitable for the application.

The reinforcing elements 19 are composed, in a known way, of the coils of a single filiform resistant element or continuous cord 23, wound in a spiral.

Figure 4:
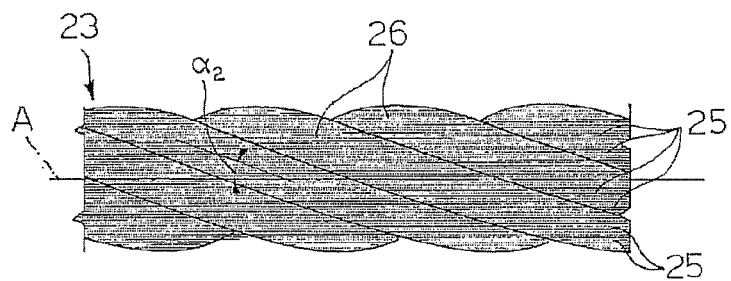
FIG. 4 is a diagram illustrating a variation of the cord construction.

The cord 23 is made, in a known way, by means of a plurality of yarns 24 twisted together (FIG. 4), which in turn are composed of filaments 25. The axis of the cord 23 is indicated with A.

Conveniently, the filaments are polyamide, preferably 6.6. An example of material that may be used is the polyamide marketed by Poliamide High Performance GmbH (Wuppertal, Germany) under the trade name ENKA®Nylon 140HRT.

According to the present invention, the cord 23 presents a construction of "double balanced twisting" type, that is in which the twists in the two twisting stages are calculated so that, in the finished cord, the filaments 25 are substantially rectilinear and parallel to one another and to the axis A of the cord. In particular, according to the present invention, the filaments form with the axis A of the cord an angle β smaller than 3° and, preferably, equal to 0°.

Figure 3:
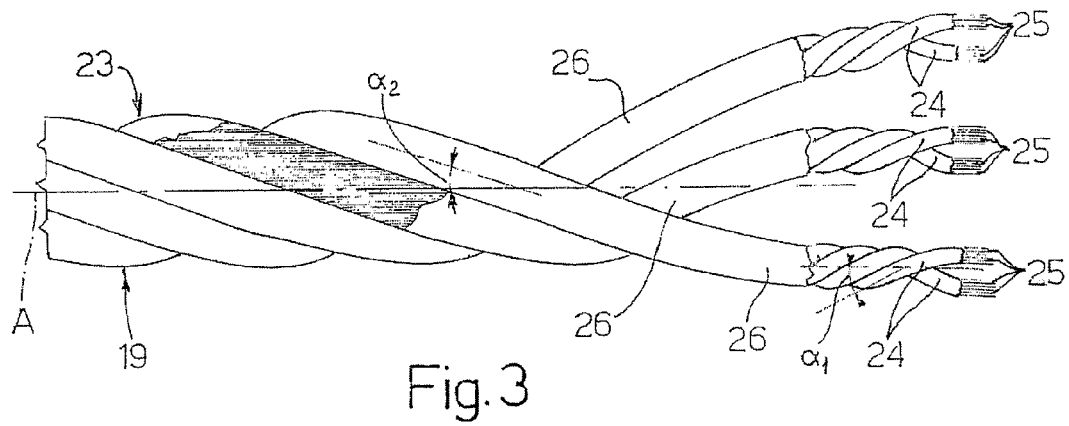
FIG. 3 is a diagram of the structure of the cords of the belt in FIG. 1.

A way of obtaining this result (FIG. 3) is to use a construction with primary twisting, in which a first number of yarns 24, for example two, are twisted together (for example in direction S) to form plied yarns 26, and a secondary twisting in which a second number of plied yarns 26 thus obtained, for example three, are twisted together in the opposite direction (for example Z) to form the cord 23; the number of twists per unit length in either case is calculated so that the angles α1 and α2 of the spirals that are obtained with twisting are substantially equal in the two cases, and the angle β formed between the filaments 25 and the axis A of the cord is therefore substantially equal to 0.

This calculation may be done, in an approximate way, by making the "twist multiplier" parameter remain constant in the two twisting stages:

$$TM = N \cdot \sqrt{LD}/3000.$$

in which N is the number of twists per meter of the twisting, and LD is the count or linear density of the plied yarn (for primary twisting) or of the cord (for secondary twisting) expressed in dtex (g/10000 m).

In particular, in the specific case the following relation must apply:

$$TM_1 = N_1 \cdot \sqrt{LD_{py}}/3000 = TM_2 = N_2 \cdot \sqrt{LD_c}/3000, \text{ that is:}$$

$$N_1 \cdot \sqrt{LD_{py}} = N_2 \cdot \sqrt{LD_c}$$

where:

$N_1$ = number of twists per meter of primary twisting (for example in direction S);
$LD_{py}$ is the plied yarn linear density expressed in dtex;
$N_2$ = number of twists per meter of secondary twisting (for example in direction Z);
$LD_c$ is the cord linear density expressed in dtex.

Using a yarn of the type mentioned above with 940 dtex, the above equation is approximately respected, for example, by a cord with construction 940 2×3 S300 Z175 (three plied yarns twisted together with 175 twists/m in direction Z, each formed of two yarns twisted together with 300 twists/m in direction S).

This in fact gives:
$TM_1 = 4.3$; $TM_2 = 4.4$;
$\alpha_1 = 24.5°$; $\alpha_2 = 24.7°$
$\beta = 0.2°$

EXAMPLES

Belts made with cord of the above type (indicated below as "belt A") were subjected to comparative tests with batches of belts identical in every other aspect, but using cord of a different type, in order to check and compare their modulus of elasticity and the tension decay in use.

The construction characteristics of the cords of the belts A, B, C are the following:
A: 940 2×3 S300 Z175 (example according to the invention)
B: 940 2×3 S150 Z125 (comparative example)
C: 940 2×3 S250 Z200 (comparative example).

The belts A, B and C have the following characteristics in common:
yarn: ENKA®Nylon 140HRT, linear density 940 dtex;
nominal length: Ln=1000 mm at the tension of 140 N/rib (rib=number of ribs of the belt).

The characteristics of the cords of the belts in examples A, B and C are summed up in table 1 below. For each type of cord, considering the production tolerances as concerns the number of twists assumed to be equal to 7% (value considered ample and precautionary), the values of the angle β were calculated both for the nominal values of the numbers of twists (columns A1, B1, C1), and with reference to the maximum deviations of these values in the opposite direction for $N_1$ and $N_2$ so as to allow for the most unfavourable combinations of tolerances: in particular, in columns A2, B2, C2 are listed the data for the case in which the number of primary twists is at the upper limit of the range of tolerance and the number of secondary twists is at the lower limit of the range of tolerance; in columns A3, B3, C3 are given the data for the case in which the number of primary twists is at the lower limit of the range of tolerance and the number of secondary twists is at the upper limit of the range of tolerance.

TABLE 1

| Belt | A | | | B | | | C | | |
|---|---|---|---|---|---|---|---|---|---|
| Cord | A1 | A2 | A3 | B1 | B2 | B3 | C1 | C2 | C3 |
| $N_1$ | 300 | 321 | 279 | 150 | 161 | 140 | 250 | 268 | 233 |
| $N_2$ | 175 | 163 | 187 | 125 | 116 | 134 | 200 | 186 | 214 |
| $LD_{py}$(dtex) | 1880 | 1880 | 1880 | 1880 | 1880 | 1880 | 1880 | 1880 | 1880 |
| $LD_c$(dtex) | 5640 | 5640 | 5640 | 5640 | 5640 | 5640 | 5640 | 5640 | 5640 |
| $A_1$ (°) | 24.5 | 26.0 | 22.9 | 12.8 | 13.7 | 12.0 | 20.8 | 22.1 | 19.4 |
| $A_2$ (°) | 24.7 | 23.2 | 26.2 | 18.2 | 17.0 | 19.4 | 27.7 | 26.1 | 29.4 |
| $TM_1$ | 4.3 | 4.6 | 4.0 | 2.2 | 2.3 | 2.0 | 3.6 | 3.9 | 3.4 |
| $TM_2$ | 4.4 | 4.1 | 4.7 | 3.1 | 2.9 | 3.3 | 5.0 | 4.7 | 5.4 |
| β (°) | −0.2 | 2.8 | −3.3 | −5.4 | −3.3 | −7.4 | −7.0 | −4.0 | −9.9 |

As may be observed, the cords of the type A belt have an angle β (in absolute value) smaller than 3.3° for twisting values within the range of tolerance of ±7° of the number of twists; the examples B and C have angles β greater in absolute value, even allowing for the possible variations due to manufacturing tolerances.

The modulus of the belts was calculated, subjecting each belt to a test using a dynamometer equipped with two fixed poly-V pulleys. The test, which had the aim of simulating the elastic behaviour of the belt during assembly, was carried out according to the following stages:
a) positioning the belt on the pulleys;
b) progressively increasing belt tension up to a value $T_1$ corresponding to a length Le equal to 1050 mm (that is equal to 5% more than the nominal installation length Ln of 1000 mm: this increase in length simulates the elongation of the belt necessary during assembly to get over the crests of the ribs and any side flanges of the pulleys);
c) releasing belt tension to a value $T_2$ corresponding to the nominal length of 1000 mm
d) Calculating modulus M with the formula:

$$M = (T1-T2)/(Le-Ln)$$

Figure 5:
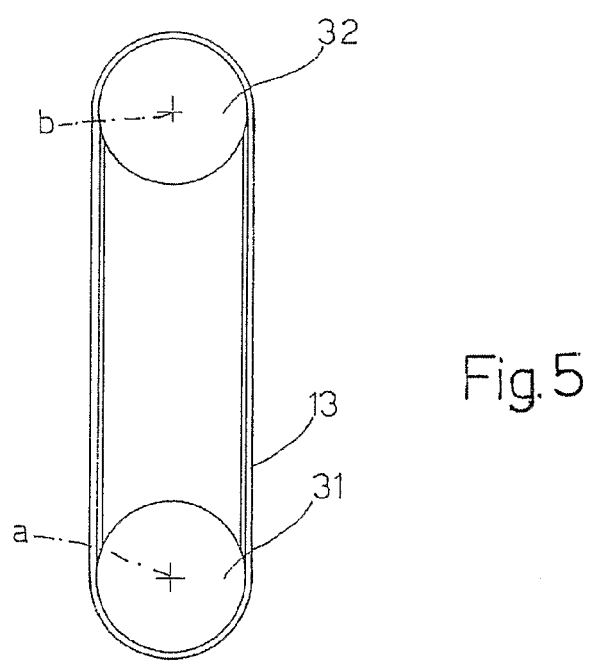
FIG. 5 is a diagram illustrating a test appliance.

The tension decay was measured in a test appliance 30 schematically illustrated in FIG. 5, essentially comprising a drive pulley 31 and a driven pulley 32 having axes a, b, parallel to each other. The centre distance between the pulleys was predetermined so as to obtain, with the project data of the belts, a theoretical static tension of 120 N/rib, a tension value equal to the test installation tension; obviously, with the same centre distance between the pulleys, the actual tension of each belt after assembly was different from the nominal value, on account of the manufacturing tolerances.

For each belt the test was carried out with the following sequence of stages:
a) fitting the belt on the pulleys
b) measuring the initial tension (Ti),
c) starting the test in the following conditions: rotation speed: 3000 rpm; torque 3.1 Nm/rib; duration: 24 hours
d) measuring the tension (Tf) at the end of the test
e) calculating the percentage decay TD=(Ti−Tf)/Ti For each batch of belts A, B, C the mean results of the modulus and of the tension decay were calculated, which are shown in the table below.

TABLE 2

| Type of belt | Modulus [N/rib · mm] | Tension decay |
|---|---|---|
| A | 8.5 | 29.2% |
| B | 10.1 | 30.2% |
| C | 7.8 | 39.8% |

From an examination of the above table it is clear how the use of a cord with a balanced construction according to the present invention (belt A) allows to reduce the modulus of the belt considerably, all other conditions being equal, and at the same time to keep the tension decay in use substantially unchanged with respect to the belts (B) of a conventional type, having cords with a non balanced structure.

The comparative example concerning belt C shows how the increase in the number of twists per unit length allows a substantial reduction of the modulus to be obtained, but it also involves a considerably worse decay.

Lastly it is clear that modifications and variations may be made to the belt realised according to the present invention without departing from the scope of protection of the claims. In particular, the material of the cord yarn may vary, for which another polyamide may be used, for example 4.6.

Moreover, the construction of the cord may vary, as long as it has a balanced structure. For example, a cord of the type 1×3 may be used (FIG. 4), that is in which three plied yarns are used made from a single yarn by means of primary twisting, which in turn are twisted together by secondary twisting, or 3×3 (three plied yarns of three yarns each). In this case too, the primary and secondary twisting must be carried out while keeping constant the "twist multiplier" parameter defined above.

The invention claimed is:

1. A poly-V belt, particularly adapted for driving accessories of an internal combustion engine, comprising a body of elastomer material, a plurality of resistant filiform inserts longitudinally sunk into the body, defined by a cord wound in a spiral, and a coupling portion integrally connected to said body and comprising a plurality of V shaped ribs adjacent to one another and alternating with V shaped races, said cord being produced from a yarn comprising a plurality of filaments by means of a first twisting in which are formed at least two plied yarns each composed of at least one said yarn and a second twisting in which said plied yarns are twisted together to form said cord, said first twisting and said second twisting being made in opposite directions, wherein in the finished cord, said filaments form an angle smaller than 3.3° with an axis of the cord, and the material constituting said yarn is selected from the group comprising polyamide 6.6 and polyamide 4.6, and the belt has a tensile modulus of elasticity lower than 9N/rib Mm and a tension decay of less than 30% after 24 hours' use.

2. A belt according to claim 1, characterised in that the angle formed by said filaments with said axis of the cord is substantially equal to 0°.

3. A belt according to claim 1, characterised in that said first twisting and said second twisting present substantially equal angles of the spiral.

4. A belt according to claim 1, characterised in that the number of twists per meter ($N_1$) of said first twisting and the number of twists per meter ($N_2$) per unit length of said second twisting are linked by the equation:

$$N_1 \cdot \sqrt{LD_{py}} = N_2 \cdot \sqrt{LD_c}$$

where:
$LD_{py}$ is the count of said plied yarns expressed in dtex; and
$LD_c$ is the count of said cord expressed in dtex.

5. A belt according to claim 1, wherein said cord has a construction 2×3.

6. A belt according to claim 1, wherein said cord has a construction 1×3.

7. A belt according to claim 1, wherein said cord has a construction 3×3.

* * * * *